Figure 1:
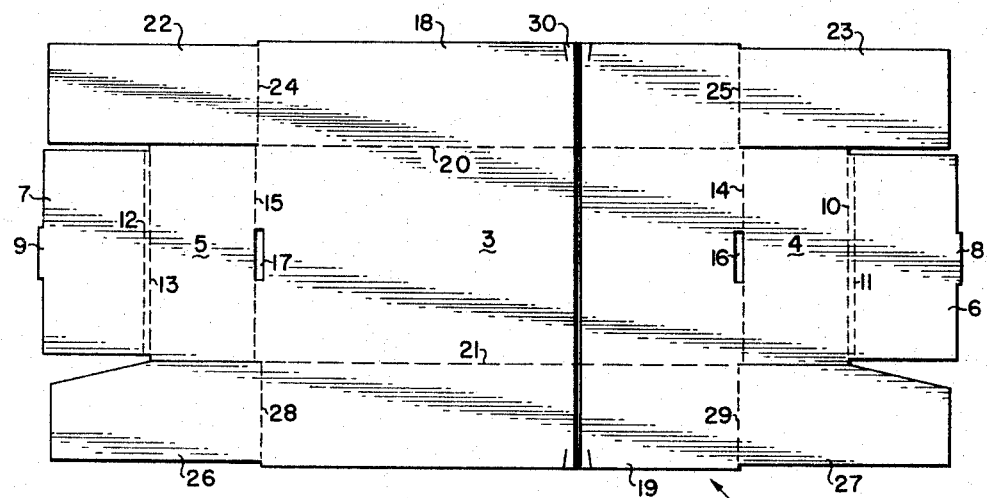

May 23, 1967 C. M. ALSYS 3,321,072
DISPENSING CARTON OF SHIRRED SAUSAGE CASINGS
Filed May 11, 1964 4 Sheets-Sheet 1

INVENTOR.
CLARENCE M. ALSYS
BY
HIS ATTORNEY

CLARENCE M. ALSYS
INVENTOR.

BY

HIS ATTORNEY

CLARENCE M. ALSYS
INVENTOR.

May 23, 1967  C. M. ALSYS  3,321,072
DISPENSING CARTON OF SHIRRED SAUSAGE CASINGS
Filed May 11, 1964  4 Sheets-Sheet 4

CLARENCE M. ALSYS
INVENTOR.

BY *Neal J. Mozely*
HIS ATTORNEY

United States Patent Office 3,321,072
Patented May 23, 1967

3,321,072
DISPENSING CARTON OF SHIRRED SAUSAGE
CASINGS
Clarence M. Alsys, Danville, Ill., assignor to Tee-Pak, Inc., Chicago, Ill., a corporation of Illinois
Filed May 11, 1964, Ser. No. 366,380
13 Claims. (Cl. 206—46)

This application is a continuation-in-part of applicant's prior copending applications Ser. Nos. 281,101, now abandoned and 507,751, now U.S. Patent 3,271,168.

This invention relates to new and useful improvements in the packaging of shirred artificial sausage casings and more particularly to a dispensing package for shirred casings.

Artificial sausage casings, particularly casings formed of regenerated cellulose, are prepared as hollow thin-walled tubes of very great length. For convenience in handling, these casings are shirred from lengths ranging from 40 to 160 ft. or more down to a shirred and compressed length of the order of a few inches. An early type shirring machine and the resulting shirred product are shown in Dietrich U.S. Patent 2,010,626. Improved forms of shirring machines and the products are shown in Korsgaard U.S. Patent 2,583,654 and Blizzard et al. Patents 2,722,714, 2,722,715 and 2,723,201.

In the preparation and use of artificial sausage casings, particularly casings formed from regenerated cellulose, the moisture content of the casings is of extreme importance. When the casings are first formed, it is necessary that they be dried to a relatively low water content, e.g. 8 to 10%. Variation in water content outside this range generally results in damage to the casing during shirring, either as a result of brittleness in the casing or from the casing sticking to the shirring mandrel.

After casing is shirred, it is packaged and shipped to meat packing houses where individual shirred strands are placed on a stuffing horn and a meat emulsion extruded to fill the casing to its fully extended length. The stuffing of the casing usually takes place within a few seconds with the result that the casing is extended from a shirred length of 8 to 27 in. to an extended length of 40 to 160 ft. or more in a matter of 3 to 12 sec. This rapid extension of the casing during stuffing requires that the casing be especially strong and resistant to tearing. If even minor holes develop in the casing, it may split or break during stuffing and waste a large quantity of meat.

In general, an average moisture content of 14 to 20% is required in shirred casing for satisfactory stuffing. Too little moisture in the casing results in excessive breakage while excessive moisture results in over plasticizing the casing and allowing it to over stuff.

In the past, shirred artificial sausage casings have been packaged in cartons or containers which are apertured at opposite ends to permit circulation of moist air through the shirred casing strand to produce the desired moisture content in the casing.

In C. M. Alsys U.S. patent application, Ser. No. 281,101, filed May 17, 1963, there is described a packaging arrangement for shirred artificial sausage casings which provides for simultaneous humidification of the casings. In that patent application it is disclosed that shirred artificial sausage casings can be humidified to the critical predetermined moisture content required for satisfactory stuffing by packaging the shirred casing strands in contact with moisture absorbent material. The shirred casing strands are preferably placed in contact with sheets of moisture absorbent pulp containing sufficient moisture to humidify the casing to the desired level. The shirred strands of casing and moistened pulp are preferably packaged within an imperforate carton and hermetically sealed. After an extended period of storage the contents of the sealed carton come to equilibrium with respect to the moisture content.

The hermetically sealed cartons will normally equilibrate at room temperature in a period ranging from about 3 to 28 days. At higher temperatures the equilibration takes place in a shorter period of time. This moisture equilibration cannot be carried out at a temperature close to the boiling point of water without producing a substantial shrinkage of the shirred casings. In this packaging technique, it has been found that the shirred casings pick up moisture uniformly from the moistened pulp sheets with little variation in moisture between the major and minor pleats of the shirred strands or between the inner and outer portion of those strands.

Recently, machines have been developed for automatic stuffing of sausage casings with meat emulsion and machines are well known for automatic linking of sausages and stripping of casings therefrom. Townsend U.S. Patent 3,115,668 discloses a radically new machine which stuffs and links automatically. The Townsend machine stuffs a shirred casing with sausage meat emulsion and forms the shirred casing into sausage links for further processing.

In automatic sausage stuffing machines of all types, and in the Townsend machine in particular, there is a need for shirred casings to be supplied in a dispensing package which permits easy removal of the casing and which can be used in association with an automatic feeding hopper for automatic handling of the casing.

Accordingly, it is one object of this invention to provide a new and improved dispensing package for shirred artificial sausage casings.

Another object of this invention is to provide a new and improved method for dispensing shirred casings in preparation for stuffing.

Still another object of this invention is to provide a new and improved dispensing carton for use in the packaging and dispensing of shirred strands of artificial sausage casings.

A feature of this invention is the provision of an improved dispensing package for artificial sausage casings having a dispensing tray portion and a cover portion which is severed and removed by use of a tear strip.

Another feature of this invention is the provision of an improved method of dispensing shirred sausage casings utilizing the improved carton or package of this invention in which the cover portion is severed and removed and a severed part of the cover used to hold a dispensing tray for dispensing strands of shirred casing therefrom.

Still another feature of this invention is the provision of a new and improved dispensing carton including a tray portion and a cover portion substantially shown and described herein.

Other objects and features of this invention will become apparent from time to time throughout the specification and claims as hereinafter related.

In the accompanying drawings there is shown a preferred embodiment of the dispensing package and of the use of the package in dispensing shirred artificial sausage casings.

Figure 2:
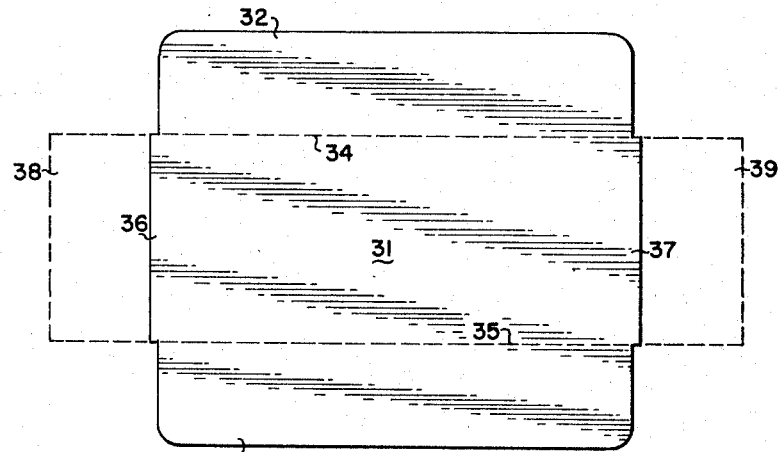
Figure 3:
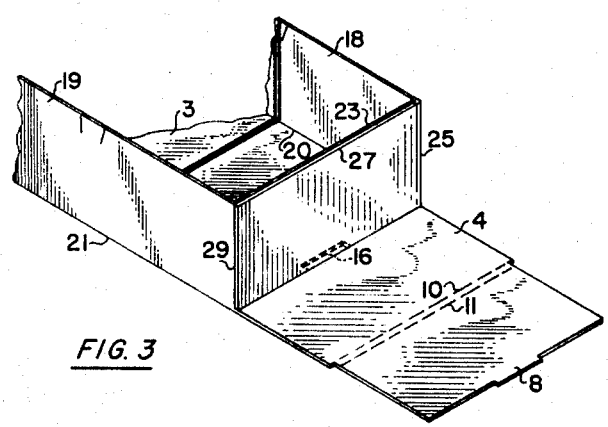
Figure 4:
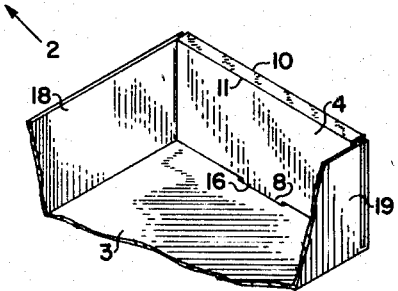
Figure 5:
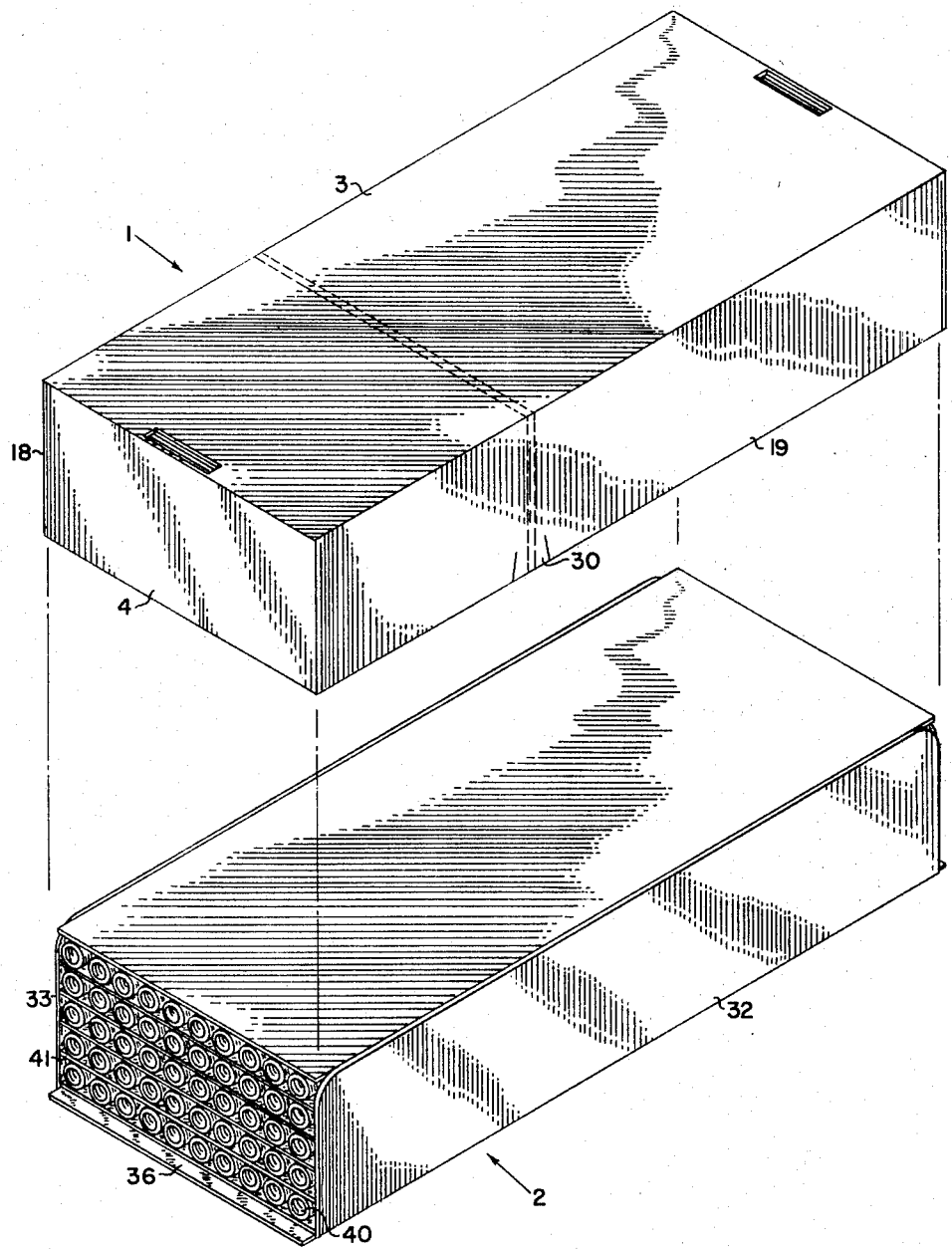
Figure 8:
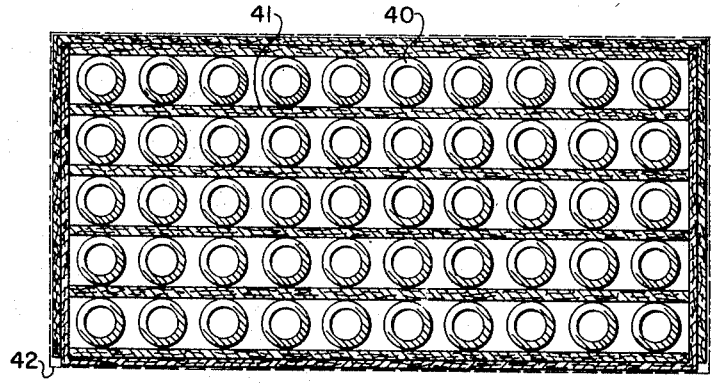
Figure 6:
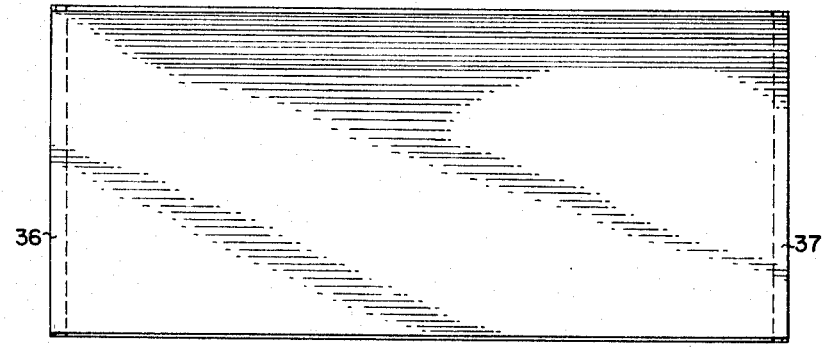
Figure 7:
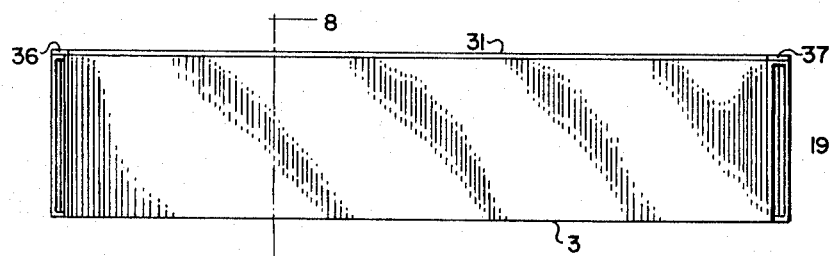
Figure 9:
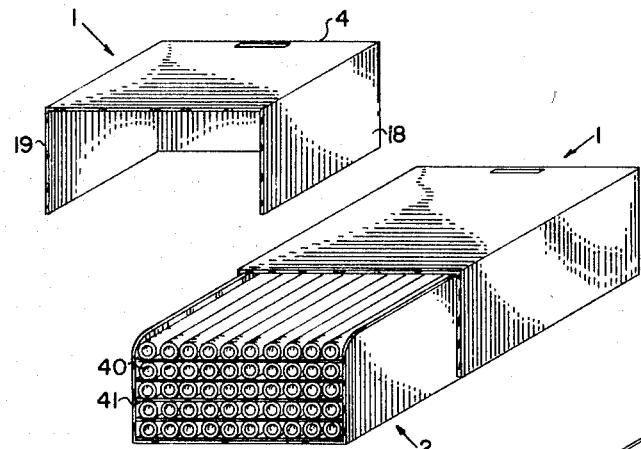
Figure 12:
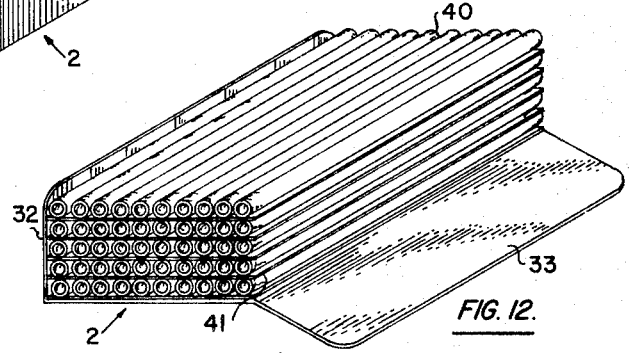
Figure 10:
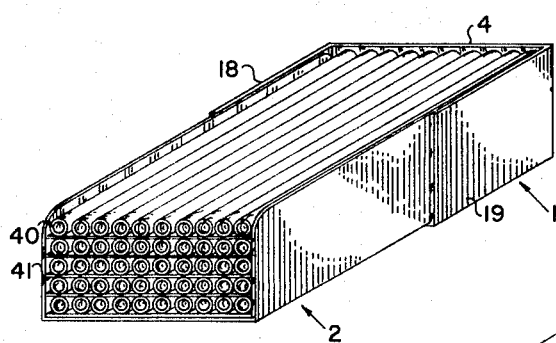
Figure 11:
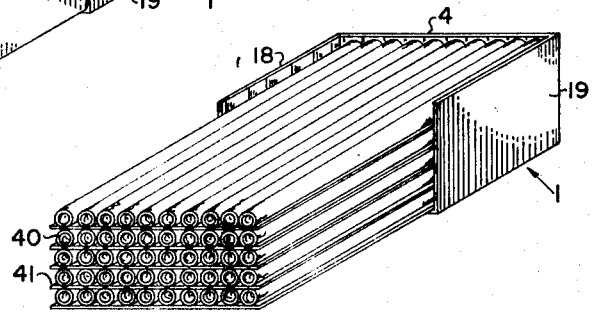

FIG. 1 is a plan view of a carton blank used in forming the cover portion of a dispensing package, FIG. 2 is a plan view of a carton blank for the tray portion of a dispensing package, FIG. 3 is a fragmentary isometric view of the end of the cover portion of the dispensing package at an intermediate stage in assembly, FIG. 4 is an isometric view of the end of the carton shown in FIG. 3 fully assembled, FIG. 5 is an exploded isometric view of the tray and cover of the dispensing carton, fully assembled and loaded with shirred strands of artificial sausage casings, FIG. 6 is a plan view of the assembled package shown in FIG. 5, FIG. 7 is a side elevation of the assembled package shown in FIG. 6, FIG. 8 is a sectional view taken on the line 8—8 of FIG. 7 and showing a moistureproof covering in dotted lines, FIG. 9 is an exploded isometric view of the assembled casing shown in FIGS. 5 to 8 with one end of the cover removed, FIG. 10 is an isometric view showing the tray portion of the dispensing package supported by one portion of the cover to permit easy dispensing of shirred strands of casing therefrom, FIG. 11 is an isometric view showing the dispensing of shirred casing strands supported only in a severed portion of the cover of the package, and FIG. 12 is an isometric view showing the use of the tray portion of the package for dispensing shirred strands of casing into an automatic hopper.

Referring to the drawings by numerals of reference and more particularly to FIGS. 1 to 4, there are shown carton blanks 1 and 2 for the cover and tray portion of the dispensing package constituting this invention. In each of the carton blanks the lines for folding, which preferably represent lines of weakness along the surface of the carton, are shown in dashed lines.

In FIG. 1, the carton cover blank 1 has a base portion 3 and end flaps 4 and 5 respectively. End flaps 4 and 5 are provided with end portions 6 and 7 having tongue portions 8 and 9 respectively. These end flaps are provided with lines of weakness or fold lines indicated at 10, 11, 12 and 13 respectively. The carton blank has fold lines or lines of weakness indicated at 14 and 15 along which the end flaps 4 and 5 are folded. Slots 16 and 17 are provided in the carton blank to cooperate with tongue portions 8 and 9 in assembly of the carton.

The carton blank 1 is also provided with side flaps 18 and 19 which are folded along fold lines or lines of weakness 20 and 21 respectively. Side flap 18 is provided with end flaps 22 and 23 which are folded along fold lines or lines of weakness 24 and 25 respectively. Side flap 19 similarly has end flaps 26 and 27 which are arranged to be folded along fold lines or lines of weakness 28 and 29 respectively.

The cover blank 1 is provided with a tear strip 30 which extends across the side flaps 18 and 19 and base portion 3 of the cover along a line parallel to the end fold lines at a position toward the middle part of the cover, preferably about one-third the distance from one end to the other.

The carton blank 2 is a blank for a tray portion of the dispensing package of this invention and comprises a base portion 31 having side flaps 32 and 33 which are foldable along fold lines or lines of weakness 34 and 35 respectively. The side flaps 32 and 33 are of a length just sufficient to fit into the cover of the carton when assembled. The base portion 31 of the tray blank has end portions 36 and 37 which extends slightly beyond the ends of side flaps 32 and 33 and which overlie the ends of the cover when assembled. In dotted lines there are shown optional end flaps 38 and 39 which can be included in the base tray portion if desired.

The assembly of the cover portion of the carton is shown in FIGS. 3 and 4. Side flaps 18 and 19 are bent upward along fold lines 20 and 21 respectively and end flaps 23 and 27 are folded inward along fold lines 25 and 29 as indicated in FIG. 3. In this position flaps 23 and 27 preferably extend across the entire width of the box to provide an extra strong end wall for the cover. In this position, end flap 4 is ready to be folded over flaps 23 and 27 to secure the end of the box in position. When this end of the box is fully assembled the end flap 4 is bent along fold lines 10 and 11 as shown in FIG. 4 and tongue 8 is inserted into slot 16. This provides an end wall comprising four thicknesses of cardboard, viz. flaps 23 and 27 and two portions of end flap 4.

The opposite end of carton cover 1 is assembled in a similar manner by folding flaps 22 and 26 along lines 24 and 28 and securing the same in place by folding end flap 5 along line 15 and again along lines 12 and 13 so that tongue 9 may be inserted into slot 17.

The tray portion of this dispensing package is assembled by merely folding side flaps 32 and 33 along fold lines 34 and 35. As previously noted, end portions 36 and 37 of base 31 of the tray extend slightly beyond the ends of side flaps 32 and 33. In an optional form of the tray, end flaps 38 and 39 would be folded along fold lines extending across base portion 31 at the ends of side flaps 32 and 33.

In FIGS. 5 to 8 there are shown several views of the dispensing package of this invention in partially and fully assembled position. In FIG. 5 the bottom tray portion 2 is shown filled with shirred artificial sausage casings 40 (which may be regenerated cellulose or fibrous or other artificial casings) arranged in five layers of ten strands each with moistened sheets of pulp 41 between each of the layers. When the tray portion 2 is filled with shirred strands of casing and moistened pulp, the cover portion 1 is placed in position as shown in FIGS. 6, 7, and 8. The carton is preferably wrapped in a moistureproof covering such as a plastic film shown in dotted line as at 42 in FIG. 8.

The carton may also be formed of cardboard having a waxed or otherwise waterproofed inner surface to prevent transfer of moisture to the walls of the carton. If necessary, the carton may be protected against moisture by a waterproof paper or plastic film positioned between the moistened pulp sheets and the walls of the carton.

As described in Alsys patent application Ser. No. 281,101, filed May 17, 1963, the extended storage of a hermetically sealed carton of shirred artificial sausage casings in contact with layers of moistened pulp results in a moisture equilibration between the pulp and casing which brings the casings to a predetermined desired moisture content.

In FIGS. 9 to 12 of the drawings there are shown several stages in the opening of the carton and dispensing of shirred strands of casing therefrom. When it is desired to open the carton, the moistureproof covering 42, which may cover an individual carton or a group of cartons, is removed. Tear strip 30 is operated to sever the cover portion of the package into two portions approximately one-third and two-thirds respectively. In FIG. 9 the carton is shown with the tear strip removed and the shorter end portion of the cover member positioned above the remainder of the carton. In this position the shirred strands of casing can be dispensed from the carton for use on a stuffing machine. If desired, the larger portion of the cover can be removed and the smaller portion used to hold the tray in position for easier removal of the shirred casing strands.

In FIG. 10, the cover has been severed and completely removed and one portion inverted and placed under the tray portion to hold the side walls of the tray in place. This permits free access to the entire length of the tray for dispensing of the shirred strands of casing to a sausage stuffing machine.

In FIG. 11, the cover has been severed and removed and the shirred casing strands removed from the tray and placed into one portion of the cover for dispensing to a stuffing machine.

In FIG. 12, the cover is removed from the carton and the tray portion alone used for dispensing shirred casings to a hopper on a sausage stuffing machine.

While this invention has been described with special emphasis upon a preferred embodiment thereof, it should be understood that within the scope of the appended claims the invention may be practiced otherwise than as described herein.

What is claimed is:

1. A dispensing package comprising a carton having an open ended tray portion with unsupported side flaps, and a cover portion with side and end flaps secured together and having a tear strip extending from side to side intermediate its ends, a plurality of strands of shirred synthetic sausage casings positioned side by side in layers, a plurality of moistened sheets of absorbent pulp positioned between successive layers of shirred casings to maintain a predetermined moisture content therein, and said tear strip being operable to sever said cover portion for removal of a portion thereof for dispensing shirred casings therefrom.

2. A dispensing package as defined in claim 1 in which the inner surfaces of the carton are waterproofed.

3. A dispensing package as defined in claim 1, including a waterproof material positioned to prevent transfer of moisture from the moistened pulp sheets to the walls of the carton.

4. A dispensing package as defined in claim 1 in which the cover portion is assembled from a box blank having side and end flaps foldable into an open box shape, said side flaps having flat portions foldable across the entire end portion of the cover, and said end flaps having portions foldable over said last named flaps to secure the same in place and having a tongue and slot connection to the top of said cover portion.

5. A dispensing package as defined in claim 4 in which said tear strip is positioned to divide said cover portion into separate segments approximately two-thirds and one-third the length thereof.

6. A dispensing package comprising a carton having an open ended tray portion with unsupported side flaps, and a cover portion with side and end flaps secured together and having a tear strip extending from side to side intermediate its ends, a plurality of strands of shirred synthetic sausage casings positioned side by side in layers, and said tear strip being operable to sever said cover portion for removal of a portion thereof for dispensing shirred casings therefrom.

7. A dispensing carton comprising (a) a tray portion having a flat base and longitudinally extending side flaps bent upwards at a right angle to said base, and (b) a plurality of strands of shirred synthetic sausage casings positioned side by side in layers in said tray portion, and (c) a cover portion assembled from a box blank having a flat base with side flaps and end flaps bent upwards at a right angle to said base, said side flaps having flat portions bent at right angles thereto and extending across the entire end portion of the cover at each end thereof, and said end flaps having portions rebent over said last named flap portions and having a tongue and slot connection to the base of said cover portion, and a tear strip extending across the side flaps and base of said cover portion substantially parallel to the ends thereof along a line extending across the middle portion of said cover, and (d) the side flaps of said tray portion fitting within said cover portion and the flat base of said tray portion overlying the entire open side of said cover portion when assembled.

8. A method of dispensing shirred casings from a carton comprising an open ended tray portion with unsupported side flaps, a cover portion with side and end flaps secured together having a tear strip extending from side to side intermediate to its ends, a plurality of strands of shirred synthetic sausage casings positioned side by side in layers in said tray portion, and a plurality of moistened sheets of absorbent pulp positioned between successive layers of shirred casings to maintain a predetermined moisture content therein, which comprises operating said tear strip severing said carton cover portion, removing only a severed part of said cover portion, and dispensing strands of casing therefrom.

9. A method of dispensing shirred casings from a carton comprising an open ended tray portion with unsupported side flaps, a cover portion with side and end flaps secured together having a tear strip extending from side to side intermediate to its ends, a plurality of strands of shirred synthetic sausage casings positioned side by side in layers in said tray portion, and a plurality of moistened sheets of absorbent pulp positioned between successive layers of shirred casings to maintain a predetermined moisture content therein, which comprises operating said tear strip severing said carton cover portion, removing said cover portion, inverting one severed part of said cover portion and placing the same under said tray portion at one end thereof to hold the sides of said tray portion in place as in open top, open-ended tray, and dispensing strands of casing therefrom.

10. A method of dispensing shirred casings from a carton comprising an open ended tray portion with unsupported side flaps, a cover portion with side and end flaps secured together having a tear strip extending from side to side intermediate to its ends, a plurality of strands of shirred synthetic sausage casings positioned side by side in layers in said tray portion, and a plurality of moistened sheets of absorbent pulp positioned between successive layers of shirred casings to maintain a predetermined moisture content therein, which comprises operating said tear strip severing said carton cover portion, removing said cover portion, placing said tray portion adjacent the hopper of an automatic stuffing machine, and dispensing strands of casing from said tray portion into said hopper.

11. A method of dispensing shirred casings from a carton comprising an open-ended tray portion with unsupported side flaps, a cover portion with side and end flaps secured together and having a tear strip extending from side to side intermediate to its ends, and a plurality of strands of shirred synthetic sausage casings positioned side by side in layers in said tray portion, which comprises operating said tear strip severing said carton cover portion, removing only a severed part of said cover portion, and dispensing strands of casing therefrom.

12. A method of dispensing shirred casings from a carton comprising an open-ended tray portion with unsupported side flaps, a cover portion with side and end flaps secured together and having a tear strip extending from side to side intermediate to its ends, and a plurality of strands of shirred synthetic sausage casings positioned side by side in layers in said tray portion, which comprises operating said tear strip severing said carton cover portion, removing said cover portion, inverting one severed part of said cover portion and placing the same under said tray portion at one end thereof to hold the sides of said tray portion in place as an open top, open-ended tray, and dispensing strands of casing therefrom.

13. A method of dispensing shirred casings from a carton comprising an open-ended tray portion with unsupported side flaps, a cover portion with side and end flaps secured together and having a tear strip extending from side to side intermediate to its ends, and a plurality of strands of shirred synthetic sausage casings positioned side by side in layers in said tray portion, which comprises operating said tear strip severing said carton cover portion, removing said cover portion, placing said tray portion adjacent the hopper of an automatic stuffing machine, and dispensing strands of casing from said tray portion into said hopper.

References Cited by the Examiner

UNITED STATES PATENTS

| | | | |
|---|---|---|---|
| 2,707,587 | 5/1955 | Wittstein | 229—34 |
| 2,758,781 | 8/1956 | White | 229—34 X |
| 2,944,717 | 7/1960 | Lynch | 206—46 X |
| 2,960,149 | 11/1960 | Throssell | 229—34 X |
| 3,028,952 | 4/1962 | Milio et al. | 206—46 |
| 3,097,784 | 7/1963 | Schaus | 229—51 |
| 3,167,237 | 1/1965 | Negus et al. | 229—51 |
| 3,191,846 | 6/1965 | Desmond | 229—34 |

LOUIS G. MANCENE, *Primary Examiner.*